(12) United States Patent
Yamashita et al.

(10) Patent No.: US 7,992,538 B2
(45) Date of Patent: Aug. 9, 2011

(54) METHOD OF CONTROLLING AN INTERNAL COMBUSTION ENGINE AND SYSTEM INCLUDING THE ENGINE

(75) Inventors: Hiroyuki Yamashita, Hiroshima (JP); Takeo Yamauchi, Aki-gun (JP); Masatoshi Seto, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 495 days.

(21) Appl. No.: 12/240,771

(22) Filed: Sep. 29, 2008

(65) Prior Publication Data
US 2009/0093946 A1 Apr. 9, 2009

(30) Foreign Application Priority Data
Oct. 3, 2007 (JP) ................................. 2007-259801

(51) Int. Cl.
*F02B 3/00* (2006.01)
*F02B 5/00* (2006.01)
(52) U.S. Cl. ........................................ 123/299; 123/305
(58) Field of Classification Search ................. 123/27 R, 123/295, 299, 300, 305, 568.14; 701/103, 701/104, 108
See application file for complete search history.

(56) References Cited

U.S. PATENT DOCUMENTS

| | | | |
|---|---|---|---|
| 7,089,908 B2* | 8/2006 | Fujieda et al. | 123/299 |
| 7,093,568 B2* | 8/2006 | Yang | 123/27 R |
| 7,117,830 B1* | 10/2006 | Boyer et al. | 123/90.15 |
| 7,156,070 B2 | 1/2007 | Strom et al. | |
| 7,194,996 B2* | 3/2007 | Koopmans | 123/295 |
| 7,644,696 B2* | 1/2010 | Ostberg et al. | 123/299 |
| 7,716,919 B2* | 5/2010 | Murase et al. | 60/289 |
| 7,810,463 B2* | 10/2010 | Otterspeer et al. | 123/179.1 |
| 7,861,690 B2* | 1/2011 | Moriya et al. | 123/406.41 |
| 2006/0288966 A1* | 12/2006 | Yang | 123/27 R |
| 2009/0070007 A1* | 3/2009 | Natsui et al. | 701/103 |
| 2009/0164100 A1* | 6/2009 | Ostberg et al. | 701/103 |
| 2010/0242901 A1* | 9/2010 | Seto et al. | 123/299 |

FOREIGN PATENT DOCUMENTS

| | | |
|---|---|---|
| JP | 2006/022664 | 1/2006 |
| JP | 2006/336494 | 12/2006 |
| JP | 2006/348774 | 12/2006 |

* cited by examiner

*Primary Examiner* — Thomas N Moulis
(74) *Attorney, Agent, or Firm* — Alleman Hall McCoy Russell & Tuttle LLP

(57) ABSTRACT

A method of controlling an internal combustion engine and system including the engine is provided. The method may include closing an exhaust valve of a combustion chamber of said engine during a cylinder cycle prior to opening an intake valve of said combustion chamber. The method may include, when a desired engine torque is a predetermined torque or greater, supplying a first pilot fuel into said combustion chamber after said exhaust valve closing and supplying a first main fuel into said combustion chamber after the combustion of said first preliminary fuel during the cylinder cycle. The method may include, when a desired engine torque is less than said predetermined torque, supplying a second pilot fuel into said combustion chamber after said exhaust valve closing during the cylinder cycle and supplying a second main fuel into said combustion chamber after the supplying of said second pilot fuel into said combustion chamber.

20 Claims, 10 Drawing Sheets

METHOD OF CONTROLLING AN INTERNAL COMBUSTION ENGINE AND SYSTEM INCLUDING THE ENGINE

TECHNICAL FIELD

The present description relates to a gasoline engine which combusts a compressed premixed air-fuel mixture by auto-ignition. More particularly, the description pertains to a method for operating an internal combustion engine or system which can perform homogeneous charge compression ignition (HCCI) combustion.

BACKGROUND AND SUMMARY

In recent years, a new type of gasoline combustion has been demonstrated. In particular, a pre-mixed air-fuel mixture is compressed in a combustion chamber such that the mixture combusts without using a spark plug to initiate the combustion. This type of combustion, referred as homogeneous charge compression ignition (HCCI) combustion, has been developed to improve fuel economy and emissions of gasoline engines. HCCI may also be referred to as compressed self ignition.

To perform this HCCI operation, a technology is known for keeping combusted gas in a combustion chamber of the engine as an internal exhaust gas recirculation (EGR) during a predetermined engine state, such as a partial-load state. This technology accomplishes this functionality by controlling exhaust valve closing timing and intake valve opening timing to provide a negative overlap period wherein both an intake and an exhaust valve are closed.

One example of a method of operating a gasoline engine using HCCI combustion is described by Japanese Unexamined Patent Application Publication No. 2006-22664. This reference describes increasing the concentration of oxygen supplied into a combustion chamber during a compressed self ignition operation when a desired engine condition is within a predetermined higher speed region or a predetermined higher load region to decrease engine output.

Another example of a method of operating a gasoline engine using HCCI combustion is described by U.S. Pat. No. 7,156,070. This patent describes a technology of injecting at least part of the fuel in a cylinder cycle as a pilot fuel in the negative overlap period to form radials, intermediates or combustion products that can control self ignition timing.

In particular, the self ignition timing is controlled by adjusting a pilot fuel amount in response to an engine knock signal and a combustion stability signal from engine operation sensors such as an engine knocking sensor, an in-cylinder pressure sensor, or an acceleration sensor.

Also, as a technology of providing the negative overlap period, the valve operating mechanisms described in Japanese Unexamined Patent Application Publication No. 2006-336494 and Japanese Unexamined Patent Application Publication No. 2006-348774 are well-known.

It is desirable to enlarge a partial load region where the compressed self ignition operation is performed to higher load regions to the extent possible in order to improve exhaust characteristics and fuel efficiency, and to decrease pumping losses by performing compressed self ignition operation.

However, the inventors herein have recognized that in relatively high load regions, providing a negative overlap period and increasing concentration of oxygen supplied into a combustion chamber according to an internal EGR amount as described above with respect to Japanese Unexamined Patent Application Publication No. 2006-22664, can make it easier to generate an unintended surface ignition within the cylinder, resulting in undesirable early ignition.

Meanwhile, as described above, another related art of U.S. Pat. No. 7,156,070 controls compressed self ignition timing by adjusting an amount of a pilot fuel injected into a combustion chamber in the negative overlap period in response to an engine knock signal and a combustion stability signal to improve engine combustion stability.

However, the inventors herein have recognized that undesirable early ignition can result in a decrease of combustion stability in this related art, especially at relatively high engine load and/or high engine speed, because self ignition of fuel occurs all at once. Thus, increase of in-cylinder temperature and pressure may occur within a relatively short period.

One aspect of the present description includes a method of controlling an internal combustion engine, the method comprising: closing an exhaust valve of a combustion chamber of said engine during a cylinder cycle prior to opening an intake valve of said combustion chamber; when a desired engine torque is a predetermined torque or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first preliminary fuel during the cylinder cycle so that said first main fuel is self ignited after said intake valve closes during the cylinder cycle and combusts after a top dead center after said intake valve closing; and when a desired engine torque is less than said predetermined torque, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

This method overcomes at least some of the disadvantages of above references.

When a desired engine torque is a predetermined torque or greater, by supplying a first pilot fuel into a combustion chamber after an exhaust valve closing or in negative overlap period so that a first pilot fuel is self ignited preliminarily, and supplying a first main fuel into a combustion chamber after the combustion of the first preliminary fuel so that the first main fuel is self ignited after an intake valve closes and combusts after the compression top dead center is passed, increase of in-cylinder temperature and pressure is divided into two stages, which can substantially reduce a possibility of undesirable early ignition of main fuel supplied after the exhaust top dead center and substantially improve combustion stability at relatively high engine loads.

Accordingly, such an approach can expand an operation range where HCCI operation can be performed to relatively higher engine loads.

In an example embodiment, a first pilot fuel is self ignited between said exhaust valve closing and said intake valve opening.

In one example embodiment, a first main fuel and second main fuel increase as the desired engine torque increases, and the first main fuel is less than the second main fuel when the desired engine torque increases across a predetermined torque.

This can be used to determine an amount of pilot fuel that will result in compressed self ignition in the negative overlap period, and to decrease fuel supplied after the exhaust top dead center, thereby inhibiting undesirable early ignition in a cylinder.

In one example embodiment, a first pilot fuel increases as the desired engine torque increases.

In another example embodiment, a period between an exhaust valve closing and an intake valve opening or a negative overlap period during the cylinder cycle increases as the desired engine torque increases when the desired engine torque is greater than a predetermined torque.

This can promote the performance of pilot fuel compressed self ignition in the negative overlap period and improve combustion stability in this stage. Further, this can decrease fuel supplied after the exhaust top dead center, which can inhibit undesirable early ignition in a cylinder.

In one example embodiment, an intake valve opening retards as the desired engine torque increases when the desired engine torque is greater than said predetermined torque.

In another example embodiment, a period between an exhaust valve closing and an intake valve opening during the cylinder cycle decreases as the desired engine torque increases when the desired engine torque is less than a predetermined torque.

This results in decreasing internal EGR and increasing an effective compression ratio, which can expand an operation range where HCCI operation can be performed to relatively higher engine loads.

In another example embodiment, a period between said exhaust valve closing and said intake valve opening during the cylinder cycle increases when the desired engine torque increases across said predetermined torque.

A second aspect of the present description includes a method of controlling an internal combustion engine, the method comprising: closing an exhaust valve of a combustion chamber of said engine during a cylinder cycle prior to opening an exhaust valve of said combustion chamber; when an engine speed is a predetermined speed or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first pilot fuel during the cylinder cycle so that said first main fuel is self ignited after said intake valve closes during the cylinder cycle and combusts after a top dead center after said intake valve closing; and when an engine speed is less than said predetermined speed, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

This method also overcomes at least some of the disadvantages of the references described above.

When a desired engine speed is a predetermined speed or greater, by supplying a first pilot fuel into a combustion chamber after an exhaust valve closing or in negative overlap period so that a first pilot fuel is self ignited preliminarily, and supplying a first main fuel into a combustion chamber after the combustion of the first preliminary fuel so that the first main fuel is self ignited after an intake valve closes or combusts after the compression top dead center is passed, increase of in-cylinder temperature and pressure is divided into two stages, which can substantially reduce a possibility of undesirable early ignition of main fuel supplied after the exhaust top dead center and substantially improve combustion stability at relatively high engine loads.

Accordingly, such an approach can expand an operation range where HCCI operation can be performed to relatively higher engine speeds.

A third aspect of the present description includes a method controlling an internal combustion engine, the method comprising: closing an exhaust valve of a combustion chamber of said engine during a cylinder cycle prior to opening an exhaust valve of said combustion chamber; when an engine torque is a predetermined torque or greater or an engine speed is a predetermined speed or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first pilot fuel during the cylinder cycle so that said first main fuel is self ignited after said intake valve closes during the cylinder cycle and combusts after a top dead center after said intake valve closing; and when an engine torque is less than said predetermined torque and an engine speed is less than said predetermined speed, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

This method also overcomes at least some of the disadvantages of the references described above.

When a desired engine torque is a predetermined torque or greater, by supplying a first pilot fuel into a combustion chamber after an exhaust valve closing or in negative overlap period so that a first pilot fuel is self ignited preliminarily, and supplying a first main fuel into a combustion chamber after the combustion of the first preliminary fuel so that the first main fuel is self ignited after an intake valve closes or combusts after the compression top dead of center is passed, increase of in-cylinder temperature and pressure is divided into two stages, which can substantially reduce a possibility of undesirable early ignition of main fuel supplied after the exhaust top dead center and substantially improve combustion stability at relatively high engine loads.

Accordingly, such an approach can expand an operation range where HCCI operation can be performed to relatively higher engine torques.

A fourth aspect of the present description includes a system comprising: an internal combustion engine having a combustion chamber which is defined by a reciprocating piston and a cylinder accommodating said piston, an intake valve capable of opening and closing communication between an air intake path of said internal combustion engine and said combustion chamber, and an exhaust valve capable of opening and closing communication between an exhaust path of said internal combustion engine and said combustion chamber; a fuel injector capable of supplying fuel into said combustion chamber; an intake valve actuator which actuates said intake valve; an exhaust valve actuator which actuates said exhaust valve; and a controller which is configured to control: said intake and exhaust valve actuators to close said exhaust valve prior to opening of said intake valve during a cylinder cycle; said fuel injector, when a desired engine torque is a predetermined torque or greater, to supply a first pilot fuel into said combustion chamber after said exhaust valve closing during the cylinder cycle so that said first pilot fuel combusts before said intake valve opening during the cylinder cycle, and to supply a first main fuel into said combustion chamber after the combustion of said first pilot fuel during the cylinder cycle so that said first main fuel is self ignited after said intake valve closes during the cylinder cycle and combusts after a top dead center after said intake valve closing; and said fuel injector, when a desired engine torque is less than said predetermined torque, to supply a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

This system also overcomes at least some of the disadvantages of the above described references.

The above advantages and other advantages, and features of the present description will be readily apparent from the following Detailed Description when taken alone or in connection with the accompanying drawings.

BRIEF DESCRIPTION OF THE DRAWINGS

FIG. 6A shows the close timing of the exhaust valve, and FIG. 6B shows the open timing of the intake valve.

DETAILED DESCRIPTION

Hereinafter, an embodiment of the present invention will be described referring to the accompanying drawings.

Figure 1:
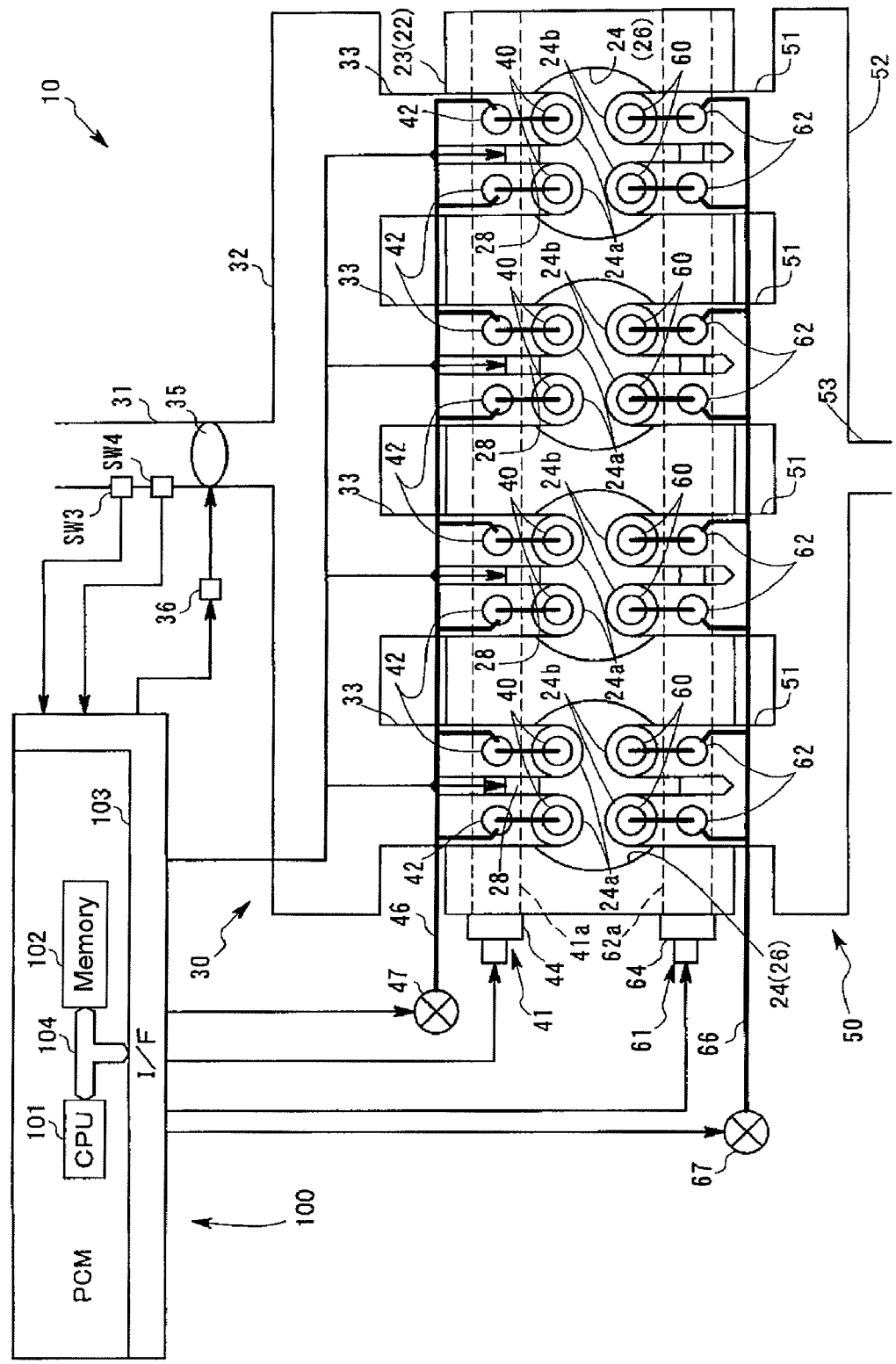
FIG. 1 is a block diagram showing a schematic configuration of a spark-ignition-type four-cycle gasoline engine according to an embodiment of the present invention.
Figure 2:
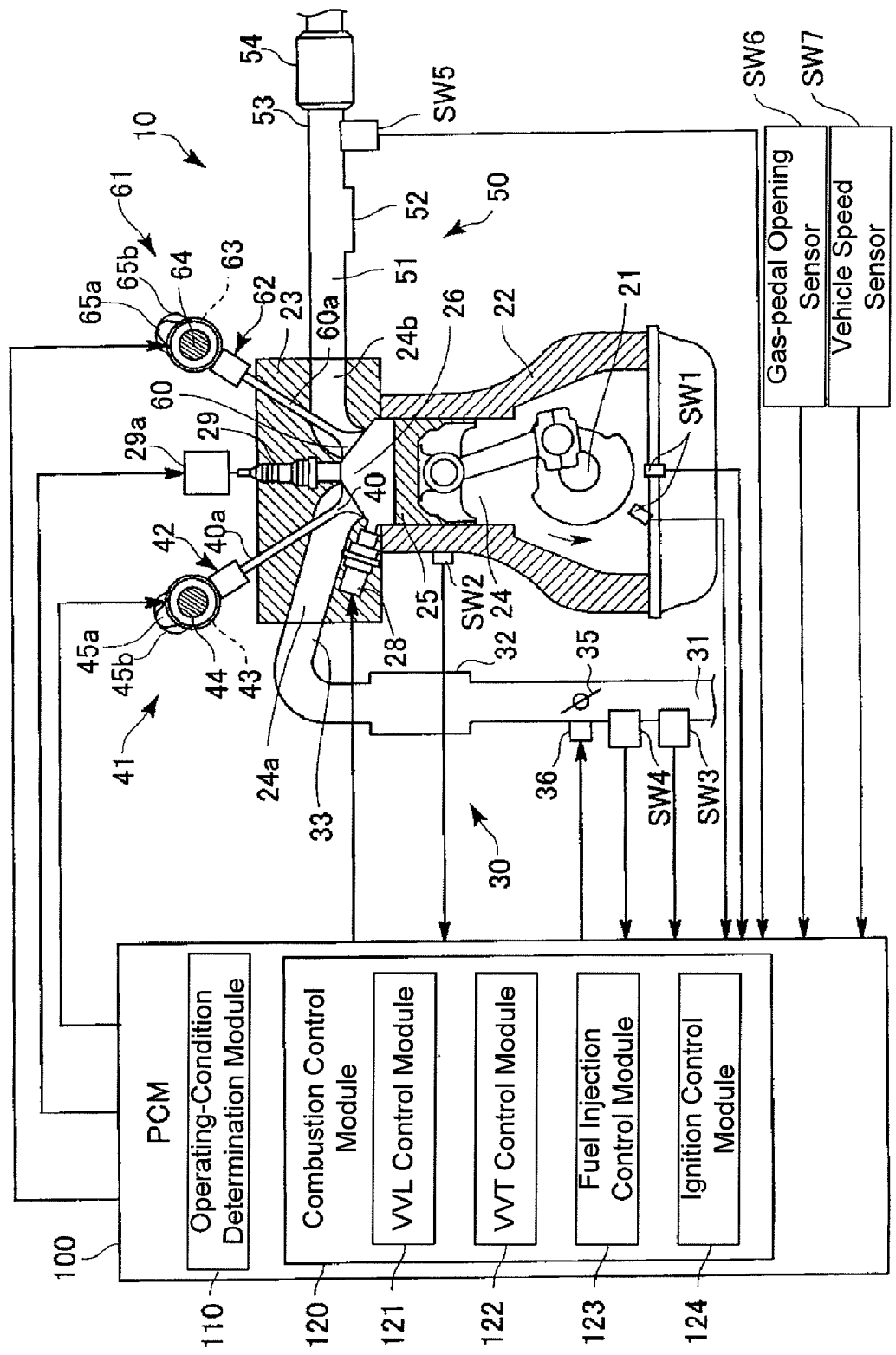
FIG. 2 is a schematic cross-sectional view showing a structure of an engine cylinder shown in FIG. 1, and an intake valve and an exhaust valve provided to the engine.
Figure 3:
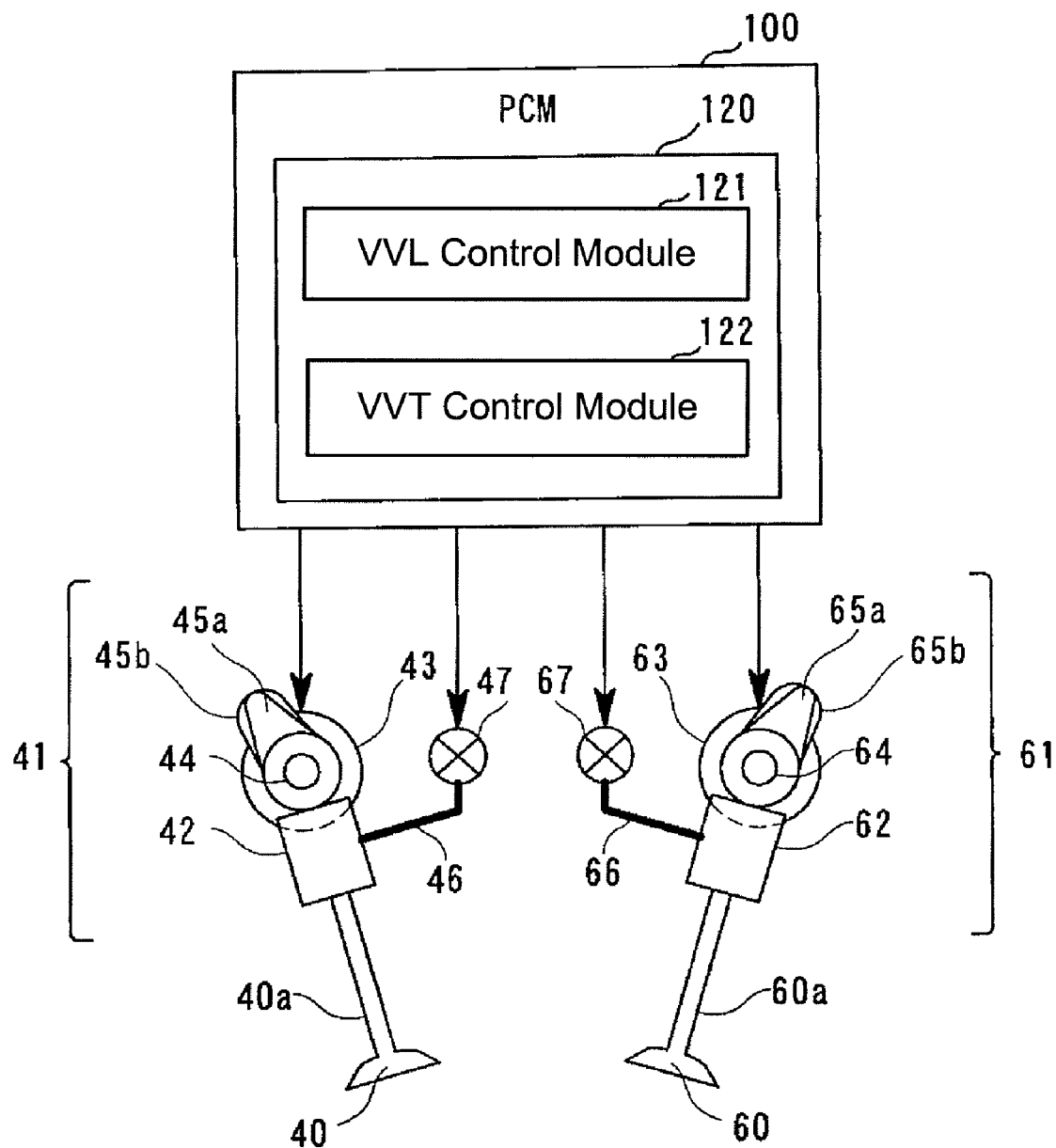
FIG. 3 is a schematic view showing a structure of valve operating mechanisms of the engine shown in FIG. 1.

FIG. 1 is a block diagram showing a schematic configuration of a spark-ignition-type four-cycle gasoline engine 10 according to an embodiment of the present invention. FIG. 2 is a schematic cross-sectional view showing a structure of a cylinder of the engine 10 shown in FIG. 1, and an intake valve 40 and an exhaust valve 60 provided to the engine. FIG. 3 is a schematic view showing a structure of valve operating mechanisms 41 and 61 of the engine 10 shown in FIG. 1.

In these figures, the engine 10 is mounted on an automobile, and an output shaft of the engine is coupled to driven wheels of the automobile through a power transmission system that includes at least a gear reduction mechanism (not illustrated). The engine 10 includes a cylinder block 22 for rotatably supporting a crankshaft 21, and a cylinder head 23 arranged above the cylinder block 22.

A plurality of engine cylinders 24 are formed in the cylinder block 22 and the cylinder head 23. A piston 25 is provided inside each of the engine cylinders 24 and connected with the crankshaft 21. The engine cylinder 24 forms a combustion chamber 26 with the piston 25, similar to a known construction. The cylinder block 22 is provided with a crank angle sensor SW1 for detecting a rotational angle of the crankshaft 21 (i.e., a crank angle), and an engine coolant temperature sensor SW2 for detecting a temperature Tw of coolant for the engine 10.

A fuel-injector 28 is provided inside the cylinder head 23 for each of the combustion chambers 26. The fuel-injector 28 is of a direct-injection type in which fuel is directly injected into each of the combustion chambers 26 from a side portion of the combustion chamber 26. The cylinder head 23 is also provided with a spark plug 29, and a tip end of the spark plug 29 faces the combustion chamber 26 at the top of the combustion chamber 26. The spark plug 29 is electrically connected with an ignition circuit 29a that can electronically control an ignition timing of the spark plug 29.

Further, the engine 10 includes an air-intake system 30 for supplying fresh air into the engine cylinder 24, and an exhaust system 50 that discharges combusted gas from the combustion chamber 26.

The air-intake system 30 includes an intake pipe 31 through which the fresh air is supplied to the engine cylinder 24, and an intake manifold 32 provided at a downstream of the intake pipe 31. The intake manifold 32 is branched from a surge tank, and the branched intake pipes 33 are connected to the respective engine cylinders 24. In this embodiment, a pair of intake ports 24a is provided to each of the engine cylinders 24 (refer to FIG. 1). Thus, the downstream end of the branched intake pipe 33 is further divided in two pipes corresponding to the pair of the intake ports 24a.

The intake pipe 31 of the air-intake system 30 is provided with an airflow sensor SW3, and an intake temperature sensor SW4 for detecting an intake air temperature Ta. Further, the intake pipe 31 is provided with a throttle valve 35 for adjusting a flow rate of the intake air. The throttle valve 35 is opened and closed by an actuator 36.

The pair of the intake ports 24a is each provided with an intake valve 40. Thus, in this embodiment, two intake valves 40 are provided to each of the cylinders 24 corresponding to the number of the intake ports 24a.

On the other hand, the exhaust system 50 includes an exhaust manifold 52 that collectively connects the branched exhaust pipes 51 at a downstream of the exhaust pipes 51, which are branched in two pipes and connected with a pair of exhaust ports 24b provided to each of the engine cylinders 24. The exhaust system 50 further includes an exhaust pipe 53 connected to the collected portion of the exhaust manifold 52, for discharging combusted gas from the exhaust manifold 52. The exhaust pipe 53 is provided with a purifying device 54 including a three-way catalyst, etc. In proximity to the purifying device 54 on the upstream side, an oxygen concentration sensor SW5 is arranged for detecting an oxygen concentration of the exhaust gas.

An exhaust valve 60 is provided inside each of the exhaust ports 24b.

Referring to FIG. 3, each of the intake valves 40 and each of the exhaust valves 60 are driven by the valve operating mechanisms 41 and 61, respectively. The valve operating mechanisms 41 and 61 include VVLs (Variable Valve Lift Mechanisms) 42 and 62 that are fixed to valve stems 40a and 60a of the intake valves 40 and exhaust valves 60, respectively, VVTs (Valuable Valve Timing Mechanisms) 43 and 63 that change open and close timings of the intake valves 40 and exhaust valves 60, respectively, camshafts 44 and 64 driven by the crankshaft 21 through the VVTs 43 and 63, respectively. The valve operating mechanisms 41 and 61 also include two sets of intake cams 45a and 45b and exhaust cams 65a and 65b that are integrally formed with the camshafts 44 and 64, respectively, for driving the intake valves 40 and the exhaust valves 60 at different phases.

The VVL 62 is to realize what is called a "lost motion" in which a function of the second exhaust cam 65b to depress the valve stem 60a of the exhaust valve 60 is turned ON and OFF at a predetermined timing. In the illustrated example, the lost motion is implemented by a tappet-type device. On the other hand, the VVL 42 turns ON and OFF a function of the second intake cam 45b to depress the valve stem 40a of the intake valve 40 at a predetermined timing. Because the mechanism of the VVLs 42 and 62 are known in the art, explanations thereof are thus omitted herein.

For each of the intake cams 45a and 45b and each of the exhaust cams 65a and 65b, ones of each (in the illustrated example, the intake cam 45a and the exhaust cam 65a) open and close the intake valve 40 and the exhaust valve 60, respectively, under so-called "compressed auto ignition operation" at a valve opening angle CA below 180 degrees. The other cams of each pair (in the illustrated example, the inlet cam 45b and the exhaust cam 65b) open and close the intake valve 40 and the exhaust valve 60, respectively, under so-called "spark-ignition operation" at a valve opening angle of 180 degrees or greater (in this embodiment, a valve opening angle $CA_{IN}$ of the intake valve 40 is 200-230 degrees, and a valve opening angle $CA_{EX}$ of the exhaust valve 60 is 180-200 degrees).

Operating oil circuits 46 and 66 are connected to each of the VVLs 42 for the intake valves 40 and each of the VVLs 62 for the exhaust valves 60, respectively. Each of the operating oil circuits 46 and 66 is controlled by electromagnetic valves 47 and 67, respectively. When supplies of the operating oil from the operating oil circuits 46 and 66 are stopped by a control of an engine control module 100 (in this embodiment, a PCM or Powertrain Control Module), which will be described later in detail, the VVLs 42 and 62 cause the lost motion of the intake cams 45b and the exhaust cams 65b, respectively. Then, the driving forces from these cams 45b and 65b are no longer transmitted to the corresponding valve stems 40a and 60a of the intake valves 40 and the exhaust valves 60. As a result, the intake valves 40 and the exhaust valve 60 are driven only by the intake cams 45a and the exhaust cams 65a. Thus, the intake valves 40 and the exhaust valves 60 perform the open and close operation at a valve opening angle CA below 180 degrees (e.g., 100-150 degrees). On the other hand, when the operating oil is supplied from the operating oil circuits 46 and 66, the intake cams 45b and the exhaust cams 65b stop the lost motion of the VVLs 42 and 62, respectively. Then, the driving forces of the intake cams 45b and the exhaust cams 65b are transmitted to the valve stems 40a and 60a of the corresponding intake valves 40 and exhaust valves 60, respectively. As a result, the intake valves 40 and the exhaust valve 60 are opened and closed at the valve opening angle CA of 180 degrees or greater, as described above.

Electromagnetic valves 47 and 67 are provided to the operating oil circuits 46 and 66. The electromagnetic valves 47 and 67 are controlled by the engine control module 100.

The VVTs 43 and 63 change the rotation phases of the camshafts 44 and 64 with respect to the crankshaft 21 by controlling the oil pressure to be supplied, for example to an advance-side oil chamber that is coaxially provided with the camshafts, and a retard-side oil chamber. As described above, the intake cams 45a and 45b and the exhaust cams 65a and 65b steplessly change the timings to drive the intake valves 40 and exhaust valves 60. This configuration is disclosed in JP2006-336494A, JP2006-348774A, etc. that have been previously proposed by the inventor(s) and, thus, explanations thereof in detail are omitted herein.

Next, the engine control module 100 will be explained in detail.

As shown in FIG. 1, the engine control module 100 includes a CPU 101, a memory 102, an interface 103, and a bus 104 that connects these components 101-103. As shown in FIG. 2, various detectors are connected to the engine control module 100 via the interface 103 as input elements, such as the crank angle sensor SW1, the engine coolant temperature sensor SW2, the airflow sensor SW3, the intake temperature sensor SW4, and the oxygen concentration sensor SW5, which have already been described. The input elements also includes a gas-pedal opening sensor SW6 for detecting an amount of operator's stepping on a gas pedal of the automobile, and a vehicle speed sensor SW7. On the other hand, control elements such as the fuel-injector 28, the ignition circuit 29a for controlling ignition by the spark plugs 29, the actuator 36 of the throttle valve 35 (also refer to FIG. 1), the electromagnetic valve (not shown) provided to the VVTs 43 and 63 of the valve operating mechanisms 41 and 61, and the electromagnetic valves 47 and 67 of the operating oil circuits 46 and 66 for driving the VVLs 42 and 62 are also connected to the engine control module 100.

Referring now to FIGS. 1 and 2, the memory 102 of the engine control module 100 stores control maps, data, and programs. The CPU 101 executes the stored program(s) based on the control map(s) or data, to logically function as an operating-condition determination module 110 for determining an operating condition such as, an engine speed Ne, an engine load (desired engine torque), etc., and a combustion control module 120 for controlling combustions inside the engine cylinder in accordance with the operating condition determined by the operating-condition determination module 110.

The operating-condition determination module 110 is a module that determines various operating conditions, such as an engine speed Ne, a required load Rt, an intake air temperature Ta, and an inside-cylinder temperature Tc, based on a sensor signal from each of the input elements described above. In this embodiment, detection signals of the gas-pedal opening sensor SW6 and the vehicle speed sensor SW7 are inputted into the operating-condition determination module 110 so that the operating condition of the vehicles can also be determined. The operating-condition determination module 110 determines which operating condition an operating condition of the engine 10 (e.g., the engine speed and the engine load) falls into among the above-mentioned operating conditions based on the detection signal from each of the input elements.

Figure 4:
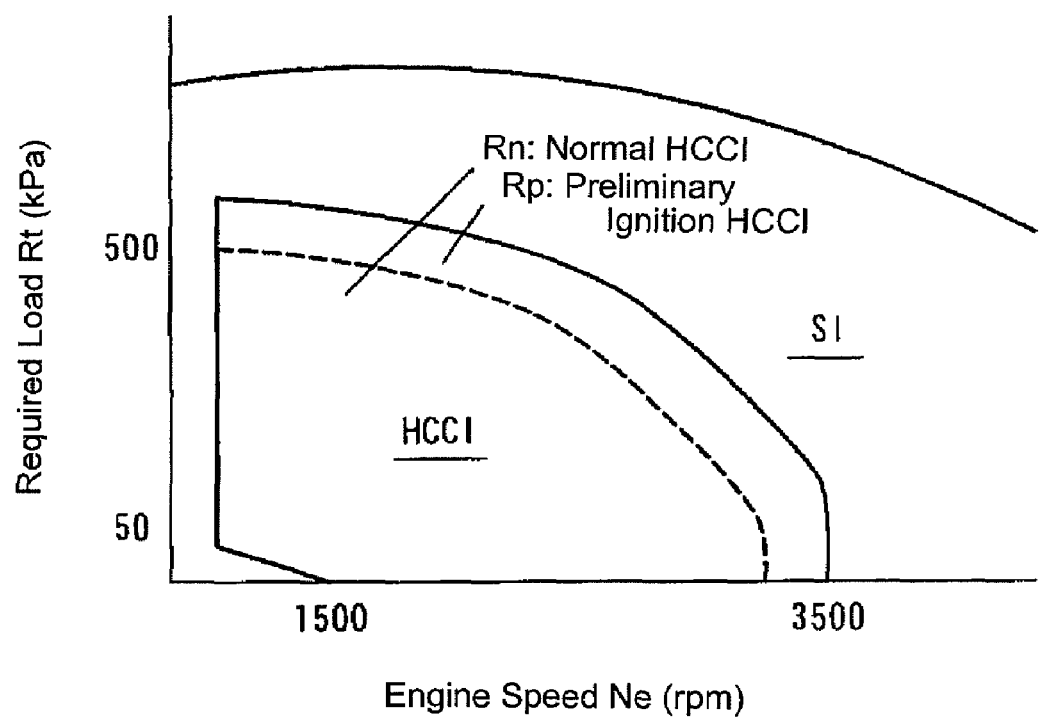
FIG. 4 is a characteristic chart showing a setting example of an operating range with which a control corresponding to an operating condition is performed, according to this embodiment.

FIG. 4 is a characteristic chart showing a setting example of an operating range within which a control corresponding to the operating condition is performed, according to this embodiment.

Referring to FIG. 4, in the operating characteristic, a partially-loaded operating range HCCI within which a compressed auto ignition is performed is provided in an operating range within which the engine speed Ne is below a predetermined engine speed (in the illustrated example, 3500 rpm). In other ranges, a spark-ignition operating range SI within which a forced ignition is performed by spark ignition is provided. In the illustrated example, in an operating range below a relatively low engine speed (in the illustrated example, 1500 rpm), spark ignition is performed (that is, the range SI) according to the engine load in order to secure combustion stability set. Further, in this embodiment, in a lower load and/or lower engine speed range in the partially-loaded operating range HCCI from a dashed line is set to a normal compressed auto ignition range Rn. In the normal compressed auto ignition range Rn, a normal mode within which injected fuel is combusted only immediately after the compression top dead center is performed. On the other hand, a higher load and/or higher speed range from the dashed line within which an excessively-early ignition may likely occur if remaining in this normal mode is set to a preliminary ignition range Rp. In this preliminary ignition range Rp, a preliminary ignition mode in which a compressed auto ignition is preliminarily performed immediately after the exhaust top dead center during a negative overlap period.

Returning to FIG. 2, the combustion control module 120 includes a VVL control module 121 and a VVT control module 122 for controlling the valve operating mechanisms 41 and 61, a fuel-injection control module 123 for controlling a fuel-injection amount and/or a fuel-injection timing of the fuel-injector 28, and an ignition control module 124 for controlling an ignition timing of the spark plug 29.

The combustion control module 120 is a module for controlling opening and closing of the intake valve 40 and the exhaust valve 60, a fuel injection by the fuel-injector 28, an ignition timing of the spark plug 29, etc. As will be described later in detail, in this embodiment, the combustion control module 120 is provided with two modes: a spark-ignition mode in which fuel-air mixture is combusted by ignition of the spark plug 29, and an HCCI mode in which fuel is ignited by the compressed auto ignition while providing a negative overlap period before and after the exhaust top dead center. Further, the HCCI mode includes a preliminary ignition mode to be performed in the preliminary ignition range Rp, and a normal mode to be performed in the normal compressed auto ignition range Rn.

The VVL control module 121 and the VVT control module 122 control the operations of the VVLs 42 and 62, and the VVTs 43 and 63, respectively.

When the operating condition determined by the operating-condition determination module 110 is a partially-loaded operating range HCCI, the VVL control module 121 controls the valve opening so that valve opening angles CA of the intake valves 40 and exhaust valve 60 are less than 180 degrees, by stopping the supply of the operating oil to the operating oil circuits 46 and 66 to cause the lost motion of the intake cams 45b and the exhaust cams 65b. Otherwise, in the spark-ignition operating range SI, the VVL control module 121 causes the operating oil to be supplied to the operating oil circuits 46 and 66 to transmit the driving force of the intake cams 45b and the exhaust cams 65b to the intake valves 40 and the exhaust valves 60 and, thus, it controls opening and closing of the intake valves 40 and the exhaust valves 60 at valve opening angles CA of 180 degrees or greater.

The VVT control module 122 determines the open and close timings of the intake valves 40 and the exhaust valves 60. The VVT control module 122 advances the close timing of the exhaust valve 60 and retards the open timing of the intake valve 40 so that the negative overlap period is generated when it is in the partially-loaded operating range HCCI according to the determination of the operating-condition determination module 110. On the other hand, the VVT control module 122 opens and closes the intake valves 40 and the exhaust valves 60 at valve opening angles of 180 degrees or greater when it is in the spark-ignition operating range SI.

The fuel-injection control module 123 controls a fuel-injection timing, a fuel-injection amount, and an air-intake flow rate (i.e., air-fuel ratio). The fuel-injection control module 123 causes fuel injections from the second half of intake stroke to the first half of compression stroke during the compressed auto ignition as similar to a well-known configuration, while causing the fuel injections at a timing described later in the spark-ignition operation.

The ignition control module 124 outputs a control signal to the ignition circuit 29a for the spark plug 29 so that fuel-air mixture is combusted immediately after the compression top dead center in the spark-ignition mode. On the other hand, in the HCCI mode, the ignition control module 124 outputs a control signal to the ignition circuit 29a to stop the spark plug 29.

Next, setting examples of the components in the combustion control module 120 will be explained in detail.

Figure 5:
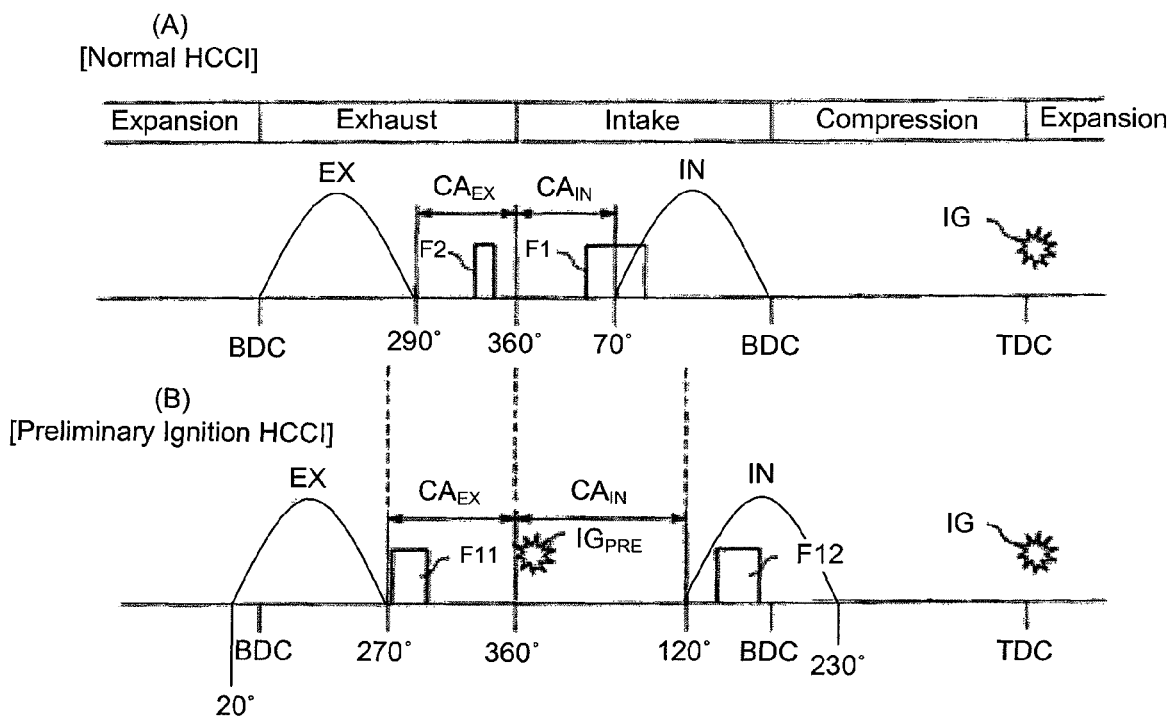
FIG. 5 is a timing chart showing an example of control settings that are set in a combustion control module, where (A) shows a normal mode, and (B) shows a preliminary ignition mode.

FIG. 5 is a timing chart showing an example of control settings that are set in the combustion control module 120, where (A) shows an example of the normal mode, and (B) shows an example of the preliminary ignition mode. In the example of FIG. 5, valve-opening periods of the intake valves and the exhaust valves are set to 110 degrees CA.

Referring to (A) of FIG. 5, when the engine 10 is operated in the normal compressed auto ignition range Rn, the VVT control module 122 controls open and close timings of the intake valves 40 and the exhaust valves 60 in the normal mode. In this normal mode, the VVT control module 122 advances the close timing of the exhaust valves 60, for example at 70 degrees before the exhaust top dead center (i.e., 290 degrees CA), and retards the open timing of the intake valves 40, for example at 70 degrees after the exhaust top dead center (i.e., 70 degrees CA). Thus, a negative overlap period of $CA_{EX}$ (70 degrees CA) and $CA_{IN}$ (70 degrees CA) are provided before and after the exhaust top dead center, respectively, and combusted gas remains and is sealed as an internal EGR or a residual gas inside the combustion chamber 26.

When the engine 10 is controlled in the normal mode, the fuel-injection control module 123 normally injects fuel F1 at a predetermined timing after the exhaust top dead center (for example, middle of the intake stroke, and in the illustrated example, immediately before the valve opening of the intake valve 40), and controls the fuel-injection amount and the air-intake amount to cause the compressed auto ignition immediately after the compression top dead center. Further, in order to generate reformed species, such as aldehyde in the engine cylinders, a portion of fuel F2 is injected during the negative overlap period $CA_{EX}$, if needed.

Referring to (B) of FIG. 5, when the engine 10 is operated in the preliminary ignition range Rp, the VVT control module 122 controls the open and close timings of the intake valves 40 and the exhaust valves 60 in the preliminary ignition mode. In the preliminary ignition mode, the VVT control module 122 advances the close timing of the exhaust valves 60, for example at 90 degrees before the exhaust top dead center (i.e., 270 degrees CA), and retards the open timing of the intake valves 40, for example at 120 degrees after the exhaust top dead center (i.e., 120 degrees CA). Thus, the negative overlap periods $CA_{EX}$ (90 degrees CA) and $CA_{IN}$ (120 degrees CA) are formed before and after the exhaust top dead center, respectively. Here, the negative overlap periods $CA_{EX}$ and $CA_{IN}$ differ between the normal mode and the preliminary ignition mode. This is because, by a control of the fuel-injection control module 123 explained below, the normal mode causes fuel to perform the compressed auto ignition (ignition IG in the figure) only immediately after the compression top dead center, on the other hand, in the preliminary ignition mode, the compressed auto ignition (ignition $IG_{PRE}$ in the figure) is performed not only immediately after the compression top dead center, but during the negative overlap period $CA_{IN}$, as well as immediately after the compression top dead center.

The fuel-injection control module 123 causes an injection of a portion of fuel F11 during the negative overlap period $CA_{EX}$ to cause a preliminary ignition $IG_{PRE}$ immediately after the exhaust top dead center. Then, the fuel-injection control module 123 causes an injection of fuel F12 to drive the engine 10 in the second half of the intake stroke and, thus, fuel-air mixture of the fuel F12 performs an auto ignition immediately after the compression top dead center, as shown by "IG."

The compressed auto ignition $IG_{PRE}$ during the negative overlap period $CA_{IN}$ is performed to prevent the excessively-early ignition from occurring before the top dead center after each of the fuel-injections by dividing the amount of fuel injection, and at the same time, to increase ignition stability of the fuel F12 that is injected after the exhaust top dead center.

In this embodiment, by performing the compressed auto ignition $IG_{PRE}$ during the negative overlap $CA_{IN}$, increase in the inside-cylinder temperature Tc and/or increase in the inside-cylinder pressure P can be distributed, and the excessively-early ignition can be controlled even in the higher speed range and/or the higher load range, or even when the engine is warm.

Figure 6A:
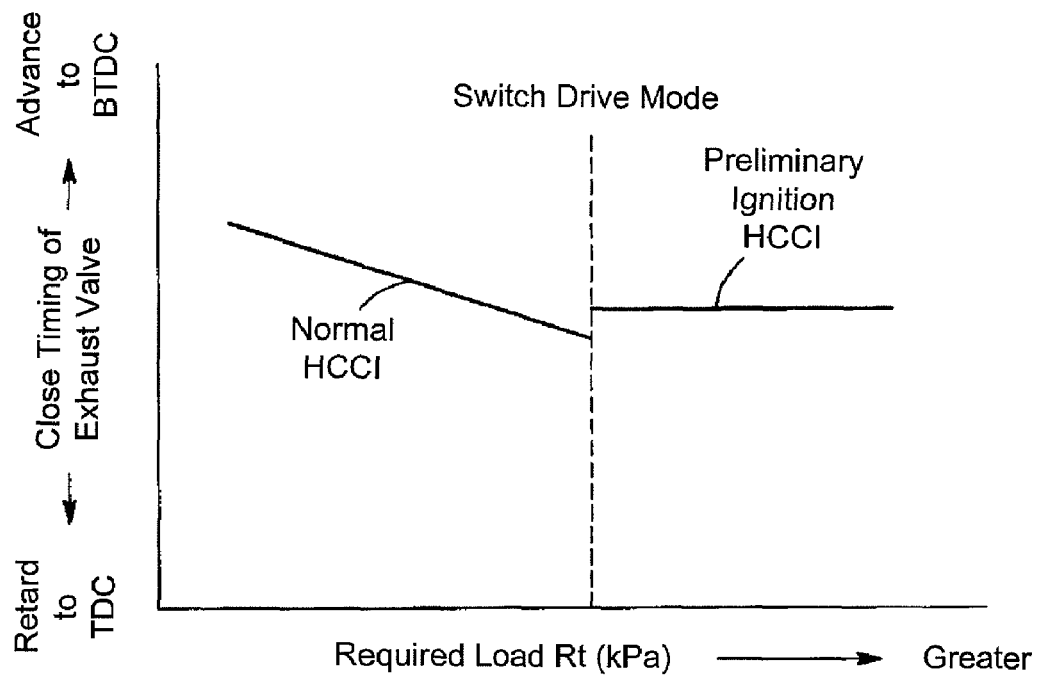
FIGS. 6A and 6B are graphs showing a setting example of open and close timings of the intake and exhaust valves by the combustion control module, where
Figure 6B:
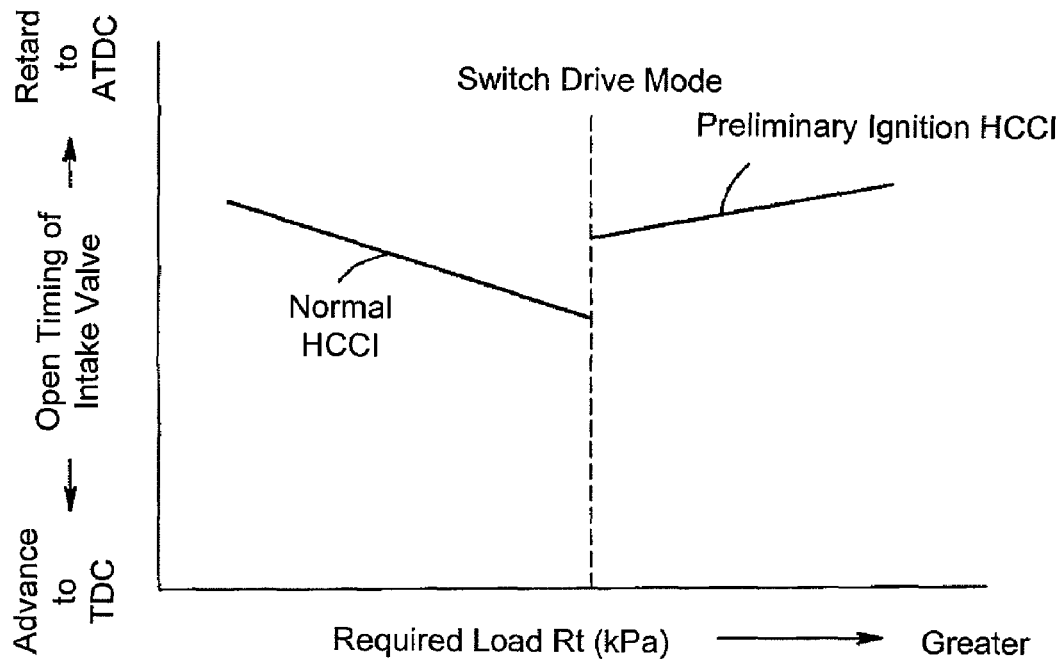
Figure 7:
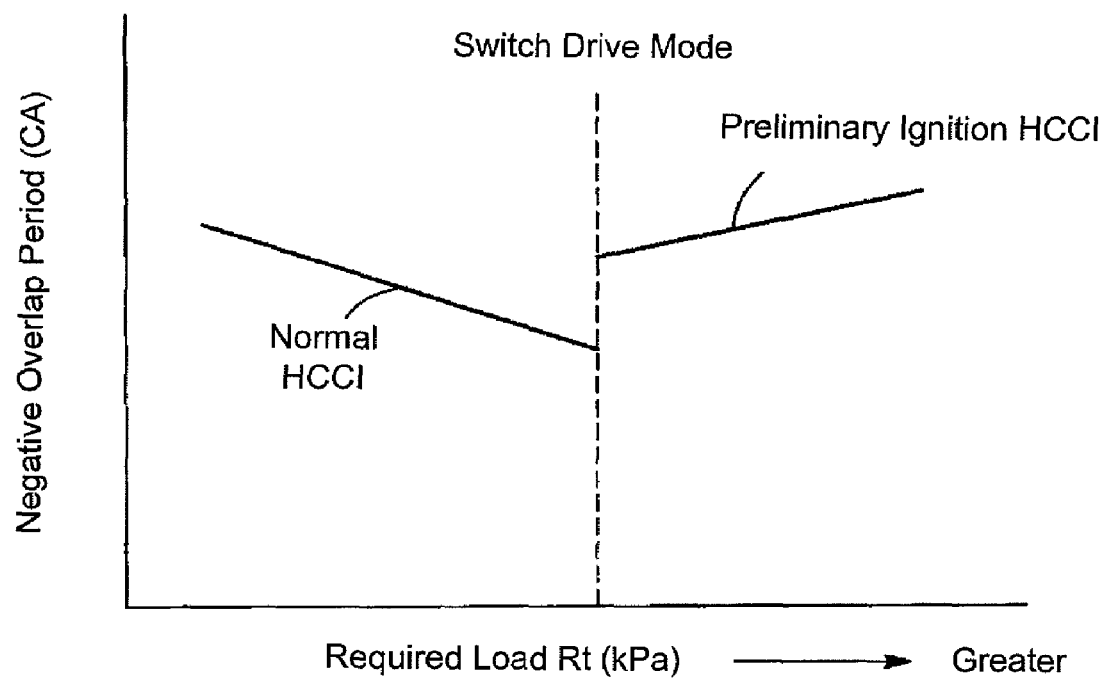
FIG. 7 is a graph showing a relationship between the required load and a negative overlap period (an amount of internal EGR) based on the setting example of FIG. 6.

FIGS. 6A and 6B are graphs showing a setting example of the valve open and close timings by the combustion control module 120, where FIG. 6A shows the close timing of the exhaust valves 60, and FIG. 6B shows the open timing of the intake valves 40. FIG. 7 shows a graph showing a relationship between the required load and the negative overlap periods (amount of the internal EGR) based on the setting example of FIGS. 6A and 6B.

Referring to FIGS. 6A and 6B, upon setting the negative overlap periods $CA_{EX}$ and $CA_{IN}$, the valve-closing control in the normal mode is configured so that the close timing of the exhaust valve 60 is retarded toward the exhaust top dead center as the required load Rt increases, while the open timing of the intake valve 40 is advanced. Thus, as shown in FIG. 7, the valve-closing control in the normal mode is configured so that the negative overlap periods $CA_{EX}$ and $CA_{IN}$ are reduced as the load increases to a higher load side. In the normal mode, in order to reduce a blow back of combusted gas into the air-intake system, or pumping loss, it is configured so that the negative overlap periods $CA_{EX}$ and $CA_{IN}$ are symmetrical.

On the other hand, in the preliminary ignition mode, the control is configured so that the close timing of the exhaust valves 60 is fixed without depending on the required load Rt, while the open timing of the intake valves 40 is retarded as the load increases. The close timing of the exhaust valves 60 at the time of switching from the normal mode to the preliminary ignition mode is advanced with respect to the close timing in a range on the higher load side in the normal mode. Thus, as shown in FIG. 7, the negative overlap periods $CA_{EX}$ and $CA_{IN}$ gradually increase as the load becomes higher, and thereby securing an effective compression ratio during the negative overlap period $CA_{EX}$, and ensuring the compressed auto ignition $IG_{PRE}$ during the negative overlap period $CA_{IN}$. In addition, the open timing of the intake valves 40 is retarded as the required load Rt increases. This is because the fuel-injection amount increases as the load becomes higher and, accordingly, the inside-cylinder pressure P at the time of the compressed auto ignition $IG_{PRE}$ becomes higher and, thus, a sufficient expansion period of the combusted gas is secured and the air blowing back into the air-intake system from the combustion chamber is prevented.

Figure 8:
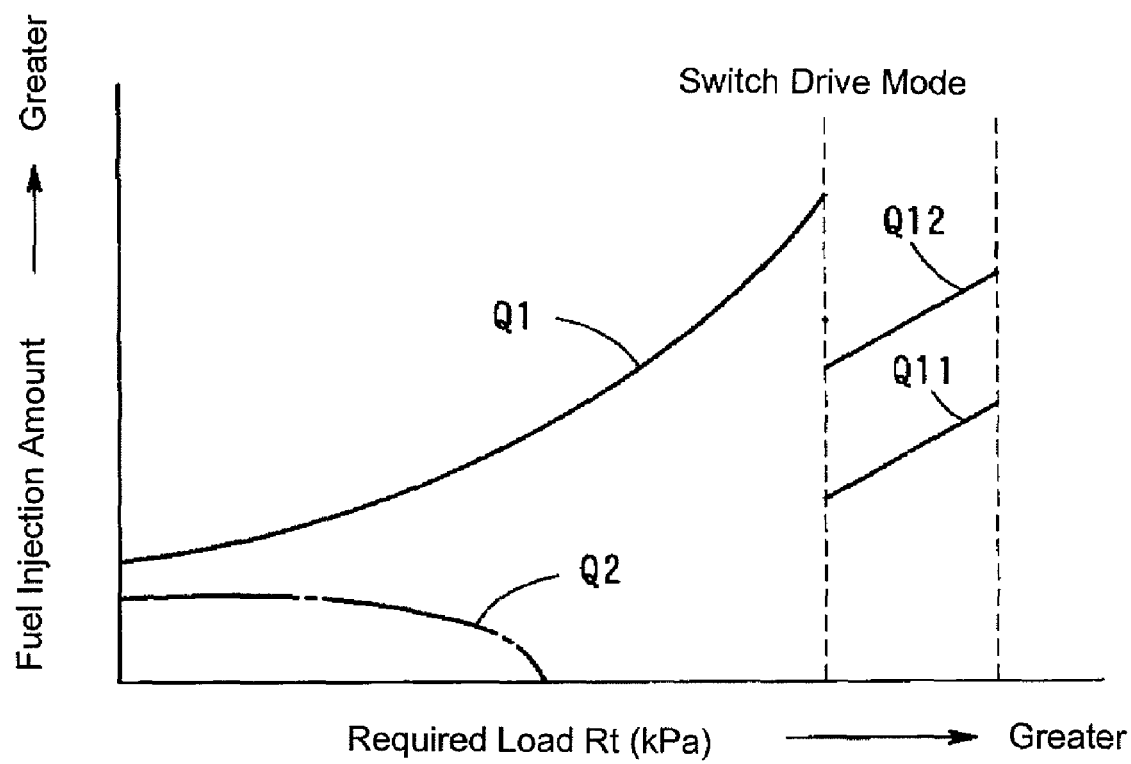
FIG. 8 is a graph showing a setting example of a fuel-injection amount with respect to the required load.

FIG. 8 is a graph showing a setting example of the fuel-injection amount Q with respect to the required load Rt.

Referring to FIGS. 6A and 8, in the normal mode of this embodiment, by injecting a predetermined amount of fuel F2 during the negative overlap period $CA_{EX}$, highly-reactable activated species are generated inside the engine cylinders, and ignition performance is improved. An injection amount Q1 of the fuel F1 for the compressed auto ignition increases at an accelerated pace as the required load Rt increases, while the injection amount Q2 of the fuel F2 for the activation is relatively set to a small amount only for a lower load.

On the other hand, referring to FIGS. 6B and 8, in the preliminary ignition mode, the injection amount Q11 of the fuel F11 provided for the compressed auto ignition $IG_{PRE}$ during the negative overlap period $CA_{IN}$, and the injection amount Q12 of the fuel F12 provided for the compressed auto ignition IG immediately after the compression top dead center are both set greater as the required load Rt becomes larger. However, the compressed auto ignition $IG_{PRE}$ during the negative overlap period $CA_{IN}$ is not for intentionally driving the crankshaft 21, but is for dividing the fuel-injection amount to prevent the excessively-early ignition. Therefore, the fuel-injection amount is less than that of the fuel F12 to be injected after the exhaust top dead center with the same required load Rt.

Further, the injection amount Q11 during the negative overlap period $CA_{EX}$ in the preliminary ignition mode is greater than the injection amount Q2 during the negative overlap period $CA_{EX}$ in the normal mode. As a result, when it is switched from the normal mode to the preliminary ignition mode, the injection amount Q2 will be reduced with respect to the injection amount Q11. This is because the fuel F2 is of the injection amount Q2 that does not require the compressed auto ignition, while the fuel F11 is what requires the intentional compressed auto ignition during the negative overlap period.

Next, a control example of this embodiment will be explained.

Figure 9:
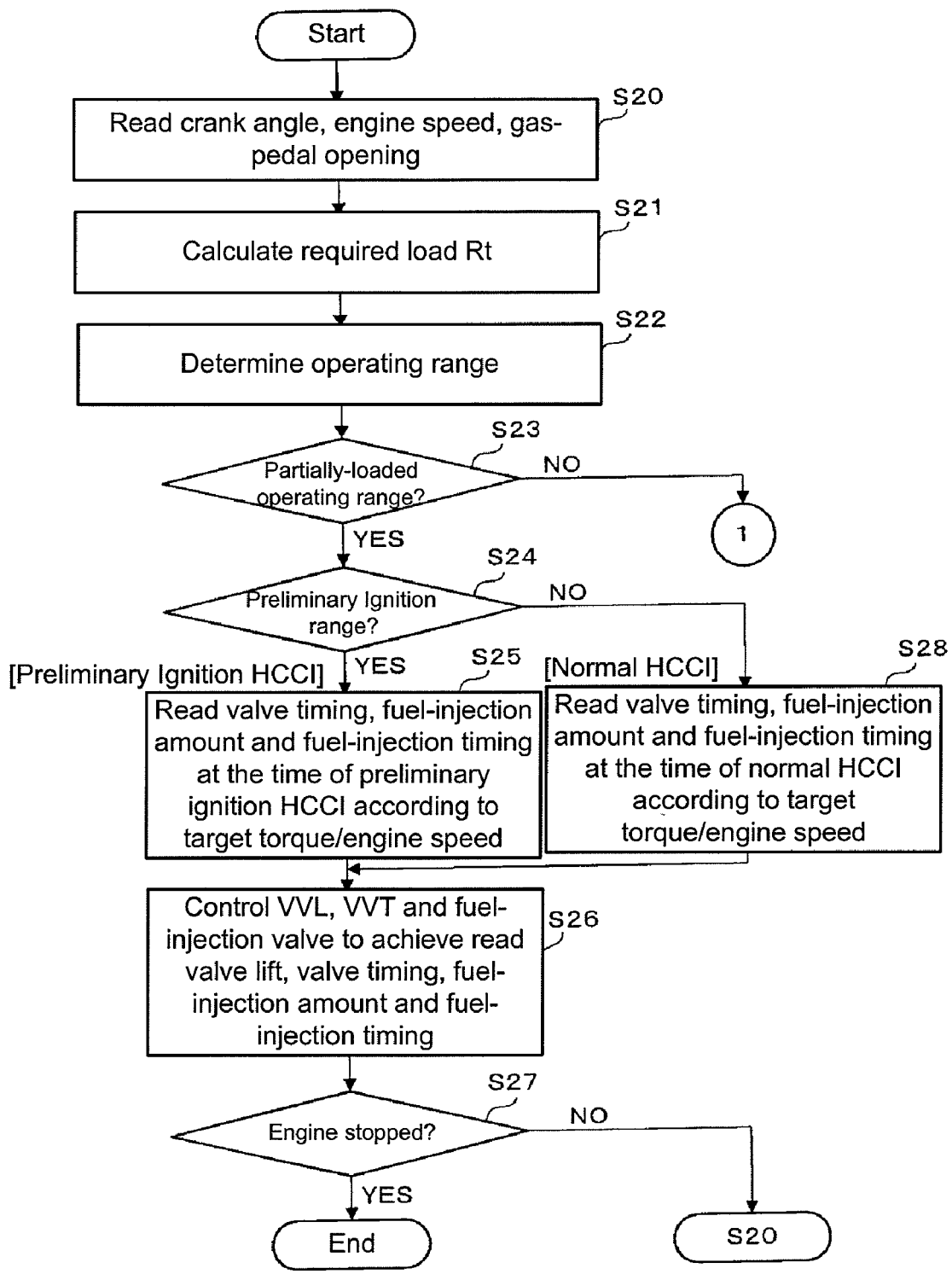
FIG. 9 is a flowchart showing a control example according to the embodiment of the present invention.
Figure 10:
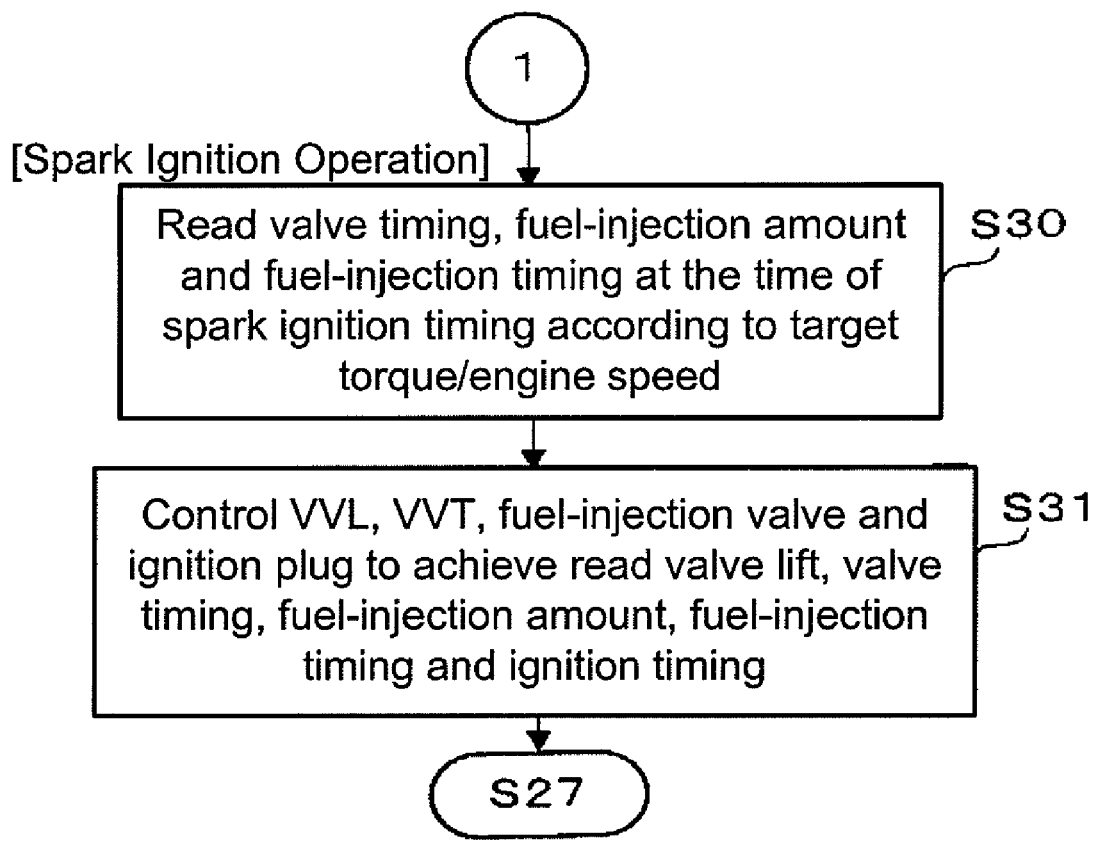
FIG. 10 is a flowchart showing the control example according to the embodiment of the present invention, together with FIG. 9.

FIGS. 9 and 10 are flowcharts showing the control example according to this embodiment of the present invention.

Referring to FIG. 9, in this control example, the engine control module 100 reads a crank angle and an engine speed detected by the crank angle sensor SW1, and a gas-pedal opening detected by the gas-pedal opening sensor SW6 to detect an operating condition of the engine 10 (Step S20). Next, the engine control module 100 calculates a required load Rt (Step S21), and then determines a present operating range based on the calculated required load Rt (Step S22). Next, the engine control module 100 determines whether the determined present operating range is a partially-loaded operating range HCCI (Step S23).

If the operating range is a partially-loaded operating range HCCI within which the compressed auto ignition operation is performed, the engine control module 100 further determines whether the calculated present operating range is a preliminary ignition range Rp (Step S24). On the other hand, if the operating range is not a partially-loaded operating range HCCI at Step S23, the engine control module 100 operates the engine 10 in the spark ignition mode.

If the engine 10 is operated in the preliminary ignition mode at Step S24, the engine control module 100 reads a valve timing, a fuel-injection amount, and a fuel-injection timing at the time of the preliminary ignition operation in accordance with the required load and the engine speed from the control map that is set for the combustion control module 120 (Step S25). Then, the engine control module 100 controls the valve operating mechanisms 41 and 61 and the fuel-injector 28 so as to achieve a valve lift, a valve timing, and a fuel-injection amount that are defined based on the read values (Step S26).

Referring also to (B) of FIG. 5, when the control of Steps S25 and S26 is performed, for each of the cylinders 24, the exhaust valves 60 are closed for example, at 90 degrees before the exhaust top dead center, and the first fuel F11 is injected immediately after that. Explaining this while paying attention to the engine cylinder 24 into which the fuel is injected, by the injection of the fuel F11 during the negative overlap period $CA_{EX}$, fuel spray is exposed to a high-temperature internal EGR inside the engine cylinder, and formaldehyde will be generated. This formaldehyde absorbs OH radicals which causes knocking, when the temperature of the combustion chamber 26 is at a relatively low temperature (below 900K). For this reason, the piston 25 will transit from the exhaust stroke to the intake stroke without causing the excessively-early ignition etc. The fuel spray causes a hot-flame reaction during this process, and the compressed auto ignition $IG_{PRE}$ occurs. The hot-flame reaction at this time causes the OH radicals to rapidly increase, and a partial oxidation reaction progresses. Therefore, it may be considered that an active fuel-air mixture that is easy to carry out the auto-ignition is generated inside the engine cylinder.

Then, fresh air is introduced into the engine cylinders by opening the intake valves 40 during a process in which the piston 25 shifts from the intake stroke to the compression stroke. As described above, the negative overlap period $CA_{IN}$ in the intake stroke is set greater enough than the negative overlap period $CA_{EX}$ in the exhaust stroke ($CA_{IN} > CA_{EX}$). Therefore, a gas pressure inside the engine cylinder increases by the compressed auto ignition $IG_{PRE}$, and then, after the gas fully expands during the negative overlap period $CA_{IN}$ in the intake stroke, fresh air is introduced into the engine cylinder. As a result, fresh air can be introduced into the engine cylinder with little pumping loss, without combusted gas flowing backwards into the air-intake system. Further, the fuel F12 is injected in the second half of the intake stroke, and the intake valve 40 is then closed. Therefore, a newly injected fuel spray will also be exposed to the high-temperature internal EGR, a multi-stage ignition phenomenon is produced in the activated atmosphere, and the auto ignition IG occurs immediately after the compression top dead center.

Then, the engine control module 100 determines a stop of the engine 10 (Step S27). If the engine 10 is stopped, the process is terminated. On the other hand, if the engine is not stopped, it returns to Step S20 to repeat the process from the beginning.

On the other hand, at Step S24, if the present operating range is the normal compressed auto ignition range Rn, the engine control module 100 operates the engine 10 in the normal mode.

If the engine 10 is operated in the normal mode, the engine control module 100 reads a valve timing, a fuel-injection amount, and a fuel-injection timing at the time of the normal ignition operation in accordance with the required load and the engine speed from the control map that is set for the combustion control module 120 (Step S28). The engine control module 100 then controls the valve operating mechanisms 41 and 61 and the fuel-injector 28 based on the read values so as to achieve a valve lift, a valve timing, and a fuel-injection amount that are defined based on the read values (Step S26).

For this reason, as shown in (A) of FIG. 5, for each of the cylinders 24, the exhaust valves 60 are closed, for example at 70 degrees before the exhaust top dead center, and the fuel F1 is injected in the first half of the intake stroke. The fuel F2 for the activation is injected during the negative overlap period $CA_{EX}$, if needed. Then, the intake valve 40 is opened and closed from the middle of the intake stroke to the first half of the compression stroke. Therefore, the fuel spray exposed to the high-temperature internal EGR is mixed with fresh air, and the compressed auto ignition IG occurs immediately after the compression top dead center.

Then, the process after Step S27 is performed similar to the preliminary ignition mode described above.

At Step S23, if the present operating range is a spark-ignition operating range SI, the engine control module 100 performs the spark-ignition operation.

Referring to FIG. 10, in the spark-ignition operation, the engine control module 100 reads a valve timing, a fuel-injection amount, a fuel-injection timing, and an ignition timing at the time of the spark-ignition operation in accordance with the required load and the engine speed from the control map that is set for the combustion control module 120 (Step S30). The engine control module 100 then controls the valve operating mechanisms 41 and 61, the fuel-injector 28, and the spark plugs 29 based on the read values so as to achieve a valve lift, a valve timing, a fuel-injection amount, and an ignition timing that are defined based on the read values (Step S31). After this process, the engine control module 100 returns to Step S27 to repeat the process.

As described above, according to this embodiment, in the partially-loaded operating range HCCI, the close timing of the exhaust valves 60 advances to before the exhaust top dead center, while the open timing of the intake valves 40 retards to after the exhaust top dead center. Thus, the negative overlap periods $CA_{EX}$ and $CA_{IN}$ during which both the intake valves 40 and the exhaust valves 60 close before and after the exhaust top dead center are formed, and combusted gas remains inside the engine cylinders as internal EGR. Here, in the partially-loaded operating range HCCI, particularly in a predetermined normal compressed auto ignition range Rn that is set for the lower-speed and lower-load side, the compressed auto ignition in the normal mode is performed. In this normal mode, the combustion control module 120 causes the fuel to inject after the exhaust top dead center. Thus, the fuel spray carries out the auto ignition immediately after the compression top dead center to operate the engine 10. On the other hand, in the preliminary ignition range Rp of the relatively higher-speed or the higher-load side, there is a concern of the excessively-early ignition if remained in the normal mode. Thus, in the preliminary ignition range Rp, the fuel injection is controlled based on the preliminary ignition mode. In this preliminary ignition mode, a portion of the fuel F11 carries out the preliminary compressed auto ignition during the negative overlap period $CA_{IN}$ of the engine cylinder, and then, the remaining fuel F12 is again injected while the exhaust valve 60 remains closed and, thus, the compressed auto ignition is carried out immediately after the compression top dead center. By the compressed auto ignition, the temperature increase and the pressure increase in the engine cylinder is distributed over two steps. Therefore, a possibility that the fuel spray injected after the exhaust top dead center causes the excessively-early ignition may significantly decrease, and combustion stability drastically improves.

In this embodiment, the combustion control module 120 injects the fuel F2 during the negative overlap period $CA_{EX}$ in the normal mode prior to the fuel F1 being injected after the exhaust top dead center. In addition, when switched from the normal mode to the preliminary ignition mode, the combustion control module 120 increases the injection amount Q11 of the fuel F11 that causes the compressed auto ignition during the negative overlap period $CA_{IN}$, compared with the injection amount Q2 during the negative overlap period $CA_{EX}$ in the normal mode, while decreasing the injection amount of the remaining fuel F12. For this reason, in this embodiment, prior to the fuel to be injected after the exhaust top dead center in the operating range of relatively lower load and lower speed where the normal mode is selected, fuel is injected during the negative overlap period $CA_{EX}$. Thus, the fuel spray is exposed to the high-temperature internal EGR inside the engine cylinder, and the active fuel-air mixture that easily causes the auto-ignition is generated. Then, the fuel is injected after the exhaust top dead center. Thus, the combustion stability can be increased even when in an operating condition in which the compressed auto ignition is relatively difficult to occur. On the other hand, when switched from the normal mode to the preliminary ignition mode, the injection amount Q11 of a portion of the fuel that causes the compressed auto ignition during the negative overlap period $CA_{IN}$ is increased compared with the injection amount Q2 of the fuel F2 injected during the negative overlap period $CA_{EX}$ in the normal mode. Therefore, the compressed auto ignition is ensured during the negative overlap period $CA_{IN}$. In addition, because the engine 10 is assisted by the compressed auto ignition, the fuel-injection amount Q12 after the exhaust top dead center can be reduced, and the excessively-early ignition inside the engine cylinders can be certainly controlled.

In this embodiment, in the normal mode, the combustion control module 120 retards the close timing of the exhaust valves 60 as the required load Rt increases, while advancing the open timing of the intake valves 40. Alternatively, in the preliminary ignition mode, the combustion control module 120 retards the open timing of the intake valves 40 as the required load Rt increases, while the close timing of the exhaust valves 60 is fixed. For this reason, in this embodiment, when the engine 10 is controlled in the normal mode, the close timing of the exhaust valves 60 is retarded and the open timing of the intake valves 40 is advanced as the required load Rt becomes higher. Therefore, the negative overlap periods $CA_{EX}$ and $CA_{IN}$ become shorter. As a result, the internal EGR decreases and an effective compression ratio become higher. Therefore, it may be possible to expand the operating range in which the compressed auto ignition is possible in a relatively higher load condition. On the other hand, in the preliminary ignition mode, the open timing of the intake valves 40 is retarded while the close timing of the exhaust valves 60 is fixed as the required load Rt becomes higher. Therefore, the internal EGR increases while the effective compression ratio is maintained. As a result, the compressed auto ignition during the negative overlap period $CA_{IN}$ can be ensured. Thus, the combustion stability in this stage can be increased, and the injection amount Q12 of the fuel F12 to be injected after the exhaust top dead center can be reduced. Further, the excessively-early ignition of the fuel spray can be prevented, and the combustion stability can be increased. Accordingly, it may be possible to relatively expand the preliminary ignition range Rp, in which the preliminary ignition mode is possible, to the higher load side or the higher engine speed side. In addition, the open timing of the intake valves 40 is retarded as the load increases. Thus, the fuel-air mixture that caused the compressed auto ignition during the negative overlap period $CA_{IN}$ can be fully expanded. Therefore, the blow back of the combusted gas into the air-intake system can be prevented.

The embodiment described above is merely illustrations of preferable examples of the present invention and, thus, the scope of the present invention will not be limited to the embodiment described above. It can be appreciated by those skilled in the art that various modifications are possible to the embodiment described above without departing from the spirit of the present invention.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of controlling an internal combustion engine, the method comprising:
    closing an exhaust valve of a combustion chamber of said engine during a cylinder cycle prior to opening an intake valve of said combustion chamber;
    when a desired engine torque is a predetermined torque or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first pilot fuel during the cylinder cycle so that said first main fuel is self ignited after said intake valve closes during the cylinder cycle and combusts after a top dead center after said intake valve closing; and
    when a desired engine torque is less than said predetermined torque, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

2. The method of claim 1, wherein said first pilot fuel is self ignited between said exhaust valve closing and said intake valve opening.

3. The method of claim 2, wherein said first main fuel and said second main fuel increase as the desired engine torque increases, and said first main fuel is less than said second main fuel when the desired engine torque increases across said predetermined torque.

4. The method of claim 3, wherein said first pilot fuel increases as the desired engine torque increases.

5. The method of claim 1, wherein a period between said exhaust valve closing and said intake valve opening during the cylinder cycle increases as the desired engine torque increases when the desired engine torque is greater than said predetermined torque.

6. The method of claim 5, wherein said intake valve opening retards as the desired engine torque increases when the desired engine torque is greater than said predetermined torque.

7. The method of claim 5, wherein a period between said exhaust valve closing and said intake valve opening during the cylinder cycle decreases as the desired engine torque increases when the desired engine torque is less than said predetermined torque.

8. The method of claim 5, wherein a period between said exhaust valve closing and said intake valve opening during the cylinder cycle increases when the desired engine torque increases across said predetermined torque.

9. The method of claim 1, wherein a period between said exhaust valve closing and said intake valve opening during the cylinder cycle increases when the desired engine torque increases across said predetermined torque.

10. A method of controlling an internal combustion engine, the method comprising:
  closing an exhaust valve of a combustion chamber of said engine during a cylinder cycle prior to opening an exhaust valve of said combustion chamber;
  when an engine speed is a predetermined speed or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first pilot fuel during the cylinder cycle so that said first main fuel is self ignited after said intake valve closes during the cylinder cycle and combusts after a top dead center after said intake valve closing; and
  when an engine speed is less than said predetermined speed, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

11. A method of controlling an internal combustion engine, the method comprising:
  closing an exhaust valve of a combustion chamber of said engine during a cylinder cycle prior to opening an exhaust valve of said combustion chamber;
  when a desired engine torque is a predetermined torque or greater or an engine speed is a predetermined speed or greater, supplying a first pilot fuel into said combustion chamber after said exhaust valve closing during the cylinder cycle so that said first pilot fuel combusts before said intake valve opening during the cylinder cycle, and supplying a first main fuel into said combustion chamber after the combustion of said first pilot fuel during the cylinder cycle so that said first main fuel is self ignited after said intake valve closes during the cylinder cycle and combusts after a top dead center after said intake valve closing; and
  when an engine torque is less than said predetermined torque and an engine speed is less than said predetermined speed, supplying a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

12. The method of claim 11, wherein said first pilot fuel is self ignited between said exhaust valve closing and said intake valve opening.

13. The method of claim 12, wherein said first main fuel and second main fuel increase as the desired engine torque increases, and said first main fuel is less than said second main fuel when the desired engine torque increases across said predetermined torque.

14. The method of claim 13, wherein said first pilot fuel increases as the desired engine torque increases.

15. The method of claim 11, wherein a period between said exhaust valve closing and said intake valve opening during the cylinder cycle increases as the desired engine torque increases when the desired engine torque is greater than said predetermined torque.

16. The method of claim 15, wherein said intake valve opening retards as the desired engine torque increases when the desired engine torque is greater than said predetermined torque.

17. The method of claim 15, wherein a period between said exhaust valve closing and said intake valve opening during the cylinder cycle decreases as the desired engine torque increases when the desired engine torque is less than said predetermined torque.

18. The method of claim 15, wherein a period between said exhaust valve closing and said intake valve opening during the cylinder cycle increases when the desired engine torque increases across said predetermined torque.

19. The method of claim 11, wherein a period between said exhaust valve closing and said intake valve opening during the cylinder cycle increases when the desired engine torque increases across said predetermined torque.

20. A control system comprising:
  an internal combustion engine having a combustion chamber which is defined by a reciprocating piston and a cylinder accommodating said piston, an intake valve capable of opening and closing communication between an air intake path of said internal combustion engine and said combustion chamber, and an exhaust valve capable of opening and closing communication between an exhaust path of said internal combustion engine and said combustion chamber;
  a fuel injector capable of supplying fuel into said combustion chamber;
  an intake valve actuator which actuates said intake valve;
  an exhaust valve actuator which actuates said exhaust valve; and
  a controller which is configured to control:
  said intake and exhaust valve actuators to close said exhaust valve prior to opening of said intake valve during a cylinder cycle;
  said fuel injector, when a desired engine torque is a predetermined torque or greater, to supply a first pilot fuel into said combustion chamber after said exhaust valve closing during the cylinder cycle so that said first pilot fuel combusts before said intake valve opening during the cylinder cycle, and to supply a first main fuel into said combustion chamber after the combustion of said first pilot fuel during the cylinder cycle so that said first main fuel is self ignited after said intake valve closes during the cylinder cycle and combusts after a top dead center after said intake valve closing; and
  said fuel injector, when a desired engine torque is less than said predetermined torque, to supply a second main fuel into said combustion chamber so that said second main fuel is self ignited after said intake valve closes during the cylinder cycle and combusts after a top dead center after said intake valve closing while no combustion occurs between said exhaust valve closing and said intake valve opening during the cylinder cycle.

* * * * *